US007865285B2

(12) United States Patent
Price et al.

(10) Patent No.: US 7,865,285 B2
(45) Date of Patent: Jan. 4, 2011

(54) MACHINE CONTROL SYSTEM AND METHOD

(75) Inventors: Robert J. Price, Dunlap, IL (US); Everett G. Brandt, Brimfield, IL (US)

(73) Assignee: Caterpillar Inc, Peoria, IL (US)

( * ) Notice: Subject to any disclaimer, the term of this patent is extended or adjusted under 35 U.S.C. 154(b) by 915 days.

(21) Appl. No.: 11/645,569

(22) Filed: Dec. 27, 2006

(65) Prior Publication Data
US 2008/0162004 A1    Jul. 3, 2008

(51) Int. Cl.
*G06F 19/00* (2006.01)

(52) U.S. Cl. .................... 701/50; 701/213; 172/4.5; 37/382; 348/47

(58) Field of Classification Search ............. 701/50, 701/49, 213; 172/4.5, 3, 7; 37/340, 382; 348/46, 47, 148; *G06F 19/00*
See application file for complete search history.

(56) References Cited

U.S. PATENT DOCUMENTS

| 4,493,968 | A | 1/1985 | Brown |
|---|---|---|---|
| 4,591,689 | A | 5/1986 | Brown et al. |
| 4,850,712 | A | 7/1989 | Abshire |
| 4,903,054 | A | 2/1990 | Wible |
| 4,918,607 | A | 4/1990 | Wible |
| 4,591,689 | A | 4/1992 | Brown et al. |
| 5,367,458 | A | 11/1994 | Roberts et al. |
| 5,471,391 | A | 11/1995 | Gudat et al. |
| 5,473,364 | A | 12/1995 | Burt |
| 5,528,498 | A | 6/1996 | Scholl |
| 5,560,431 | A | 10/1996 | Stratton |
| 5,607,205 | A | 3/1997 | Burdick et al. |
| 5,612,883 | A | 3/1997 | Shaffer et al. |
| 5,631,658 | A | 5/1997 | Gudat et al. |
| 5,646,843 | A | 7/1997 | Gudat et al. |
| 5,668,739 | A | 9/1997 | League et al. |
| 5,675,489 | A | 10/1997 | Pomerleau |
| 5,680,313 | A | 10/1997 | Whittaker et al. |
| 5,736,939 | A | 4/1998 | Corcoran |
| 5,838,562 | A | 11/1998 | Gudat et al. |
| 5,911,669 | A | 6/1999 | Stentz et al. |
| 5,951,612 | A | 9/1999 | Sahm |
| 5,963,664 | A | 10/1999 | Kumar et al. |

(Continued)

FOREIGN PATENT DOCUMENTS

WO    WO 2006/063314    6/2006

OTHER PUBLICATIONS http://www.sarnoff.com/products_services/imagers/index.asp, Sarnoff Corporation: Imagers & Cameras, p. 1, Sep. 28, 2006.

(Continued)

*Primary Examiner*—Tuan C To
(74) *Attorney, Agent, or Firm*—Finnegan, Henderson, Farabow, Garrett & Dunner LLP

(57) ABSTRACT

A machine control system may include a machine mounted stereo imaging apparatus configured to provide a 3-D model indicative of a terrain feature. The machine control system may also include a control module configured to process the 3-D model, and automatically perform an operation with a work tool based on the characteristics of the 3-D model.

20 Claims, 11 Drawing Sheets

U.S. PATENT DOCUMENTS

| | | | | |
|---|---|---|---|---|
| 5,999,866 | A | 12/1999 | Kelly et al. | |
| 6,049,619 | A | 4/2000 | Anandan et al. | |
| 6,055,042 | A | 4/2000 | Sarangapani | |
| 6,064,926 | A | 5/2000 | Sarangapani et al. | |
| 6,075,905 | A | 6/2000 | Herman et al. | |
| 6,081,606 | A | 6/2000 | Hansen et al. | |
| 6,082,466 | A | 7/2000 | Gudat | |
| 6,134,502 | A | 10/2000 | Sarangapani | |
| 6,152,648 | A | 11/2000 | Gfroerer et al. | |
| 6,173,215 | B1 | 1/2001 | Sarangapani | |
| 6,192,145 | B1 | 2/2001 | Anandan et al. | |
| 6,219,609 | B1 | 4/2001 | Matsuno et al. | |
| 6,223,110 | B1 | 4/2001 | Rowe et al. | |
| 6,247,538 | B1* | 6/2001 | Takeda et al. | 172/2 |
| 6,282,477 | B1 | 8/2001 | Gudat et al. | |
| 6,296,317 | B1 | 10/2001 | Ollis et al. | |
| 6,307,959 | B1 | 10/2001 | Mandelbaum et al. | |
| 6,336,051 | B1 | 1/2002 | Pangels et al. | |
| 6,363,173 | B1 | 3/2002 | Stentz et al. | |
| 6,363,632 | B1* | 4/2002 | Stentz et al. | 37/414 |
| 6,366,691 | B1 | 4/2002 | Sogawa | |
| 6,374,155 | B1 | 4/2002 | Wallach et al. | |
| 6,389,785 | B1* | 5/2002 | Diekhans et al. | 56/10.2 F |
| 6,437,726 | B1 | 8/2002 | Price | |
| 6,453,223 | B1 | 9/2002 | Kelly et al. | |
| 6,453,227 | B1 | 9/2002 | Kalafut et al. | |
| 6,460,260 | B1 | 10/2002 | Alster | |
| 6,571,024 | B1 | 5/2003 | Sawhney et al. | |
| 6,628,805 | B1 | 9/2003 | Hansen et al. | |
| 6,681,058 | B1 | 1/2004 | Hanna et al. | |
| 6,701,005 | B1 | 3/2004 | Nichani | |
| 6,725,142 | B2 | 4/2004 | Koch | |
| 6,760,488 | B1 | 7/2004 | Moura et al. | |
| 6,847,728 | B2 | 1/2005 | Tao et al. | |
| 6,928,353 | B2 | 8/2005 | Finley et al. | |
| 6,928,384 | B2 | 8/2005 | Kochi | |
| 6,990,390 | B2 | 1/2006 | Groth et al. | |
| 7,058,495 | B2 | 6/2006 | Budde et al. | |
| 7,099,722 | B2 | 8/2006 | Casey | |
| 7,110,728 | B2* | 9/2006 | Mizui et al. | 455/99 |
| 7,113,105 | B2 | 9/2006 | Sahm et al. | |
| 7,307,655 | B1* | 12/2007 | Okamoto et al. | 348/222.1 |
| 7,367,885 | B2* | 5/2008 | Escalera et al. | 463/32 |
| 7,454,065 | B2* | 11/2008 | Satoh | 382/190 |
| 7,509,198 | B2* | 3/2009 | Shull et al. | 701/50 |
| 2002/0083695 | A1* | 7/2002 | Behnke et al. | 56/119 |
| 2002/0162668 | A1* | 11/2002 | Carlson et al. | 172/4.5 |
| 2002/0183906 | A1 | 12/2002 | Ikeda | |
| 2003/0004645 | A1 | 1/2003 | Kochi | |
| 2003/0226290 | A1 | 12/2003 | Savard et al. | |
| 2004/0105573 | A1* | 6/2004 | Neumann et al. | 382/103 |
| 2004/0148820 | A1 | 8/2004 | Horton | |
| 2004/0148823 | A1 | 8/2004 | Schenk | |
| 2004/0252863 | A1 | 12/2004 | Chang et al. | |
| 2004/0252864 | A1 | 12/2004 | Chang et al. | |
| 2004/0264763 | A1 | 12/2004 | Mas et al. | |
| 2005/0015201 | A1 | 1/2005 | Fields et al. | |
| 2005/0275717 | A1 | 12/2005 | Camus | |
| 2006/0089764 | A1 | 4/2006 | Filippov et al. | |
| 2007/0002040 | A1* | 1/2007 | Oldroyd | 345/419 |
| 2007/0056258 | A1* | 3/2007 | Behnke | 56/10.2 R |

OTHER PUBLICATIONS http://www.sarnoffimaging.com/about/, Sarnoff Imaging Systems: About, pp. 1-2, Sep. 28, 2006.
http://www.sarnoff.com/products_services/vision/tracking/single.asp, Sarnoff Corporation: Single Camera Tracking, pp. 1-3, Sep. 28, 2006.
http://www.sarnoff.com/products_services/vision/tracking/ptz.asp, Sarnoff Corporation: PTZ Tracking, pp. 1-4, Sep. 28, 2006.
http://www.sarnoff.com/products_services/vision/tracking/aerial.asp, Sarnoff Corporation: Aerial Tracking, pp. 1-3, Sep. 28, 2006.
http://www.sarnoff.com/products_services/vision/biomed/index.asp, Sarnoff Corporation: Bio & Medical Imaging, pp. 1-2, Sep. 28, 2006.
http://www.sarnoff.com/products_services/vision/tracking/multi.asp, Sarnoff Corporation: Multi Camera Tracking, pp. 1-3, Sep. 28, 2006.
http://www.sarnoff.com/products_services/vision/atr/reacquisition.asp, Sarnoff Corporation: Reacquisition, pp. 1-2, Sep. 28, 2006.

* cited by examiner

MACHINE CONTROL SYSTEM AND METHOD

TECHNICAL FIELD

The present disclosure relates generally to a control system and method, and relates more particularly to a machine control system and method involving the use of a stereo camera system.

BACKGROUND

Machines may be employed at a job site to perform a variety of operations. Those operations may include, for example, carrying loads, moving earth, digging, and dumping. The machines used may include, for example, trucks, backhoes, excavators, dozers, and loaders. These machines may include implements or tools configured to assist with performing the aforementioned operations. The machines and their associated tools may be operated and controlled by machine operators.

A machine operator may sit in a cab containing machine controls, such as a steering wheel, joystick, and/or any other control device suitable for operating the machine. Additionally or alternatively, the machine operator may be located off-site, and may operate the machine with a remote control device. The machine operator may rely on sight to analyze the job site, steer the machine, and perform operations using the tool. However, the machine operator may have physical limitations. For example, the machine operator may have a limited field of vision, and may be incapable of seeing portions of the job site behind, to the side of, or far away from the machine. Further, the machine operator's view may be obstructed by obstacles at the job site, or even components of the machine itself. Typically, one or more sensors may be provided to assist the machine operator by attempting to compensate for these physical limitations. In doing so, the sensors may provide the machine operator with machine data and job site data. The sensors may also supply information to a machine control system, and the machine control system may assist the operator with certain tasks or operations. However, use of the sensors may not solve other issues, such as machine operator fatigue.

At least one system has been developed for automating a machine. For example, U.S. Pat. No. 6,247,538 to Takeda et al. ("Takeda") discloses an automatic excavator for excavating blast-fallen stones. The excavator is equipped with a visual sensor for recognizing the three-dimensional shape of an excavation object, and for measuring distances. However, the visual sensor in Takeda operates between two beacons. Thus, the visual sensor is not designed to recognize terrain features, such as piles, trenches, and the like, that may be located throughout a job site. Furthermore, the visual sensor does not provide an overall 3-D terrain map of the job site areas outside of the area defined by the two beacons.

The system and method of the present disclosure is directed towards overcoming one or more of the constraints set forth above.

SUMMARY OF THE INVENTION

In one aspect, the presently disclosed embodiments may be directed to a machine control system. The machine control system may include a machine mounted stereo imaging apparatus configured to provide a 3-D model indicative of a terrain feature. The machine control system may also include a control module configured to process the 3-D model, and automatically perform an operation with a work tool based on the characteristics of the 3-D model.

In another aspect, the presently disclosed embodiments may be directed to a method of controlling a machine. The method may include generating a 3-D model indicative of a terrain feature with a machine mounted stereo imaging apparatus. The method may also include processing the 3-D model. The method may further include automatically performing an operation with a work tool based on the characteristics of the 3-D model.

In yet another aspect, the presently disclosed embodiments may be directed to a machine. The machine may include a machine control system. The machine control system may include a machine mounted stereo imaging apparatus configured to provide a 3-D model indicative of a terrain feature. The machine control system may also include a control module configured to process the 3-D model, and automatically perform an operation with a work tool based on the characteristics of the 3-D model.

DETAILED DESCRIPTION

Figure 1:
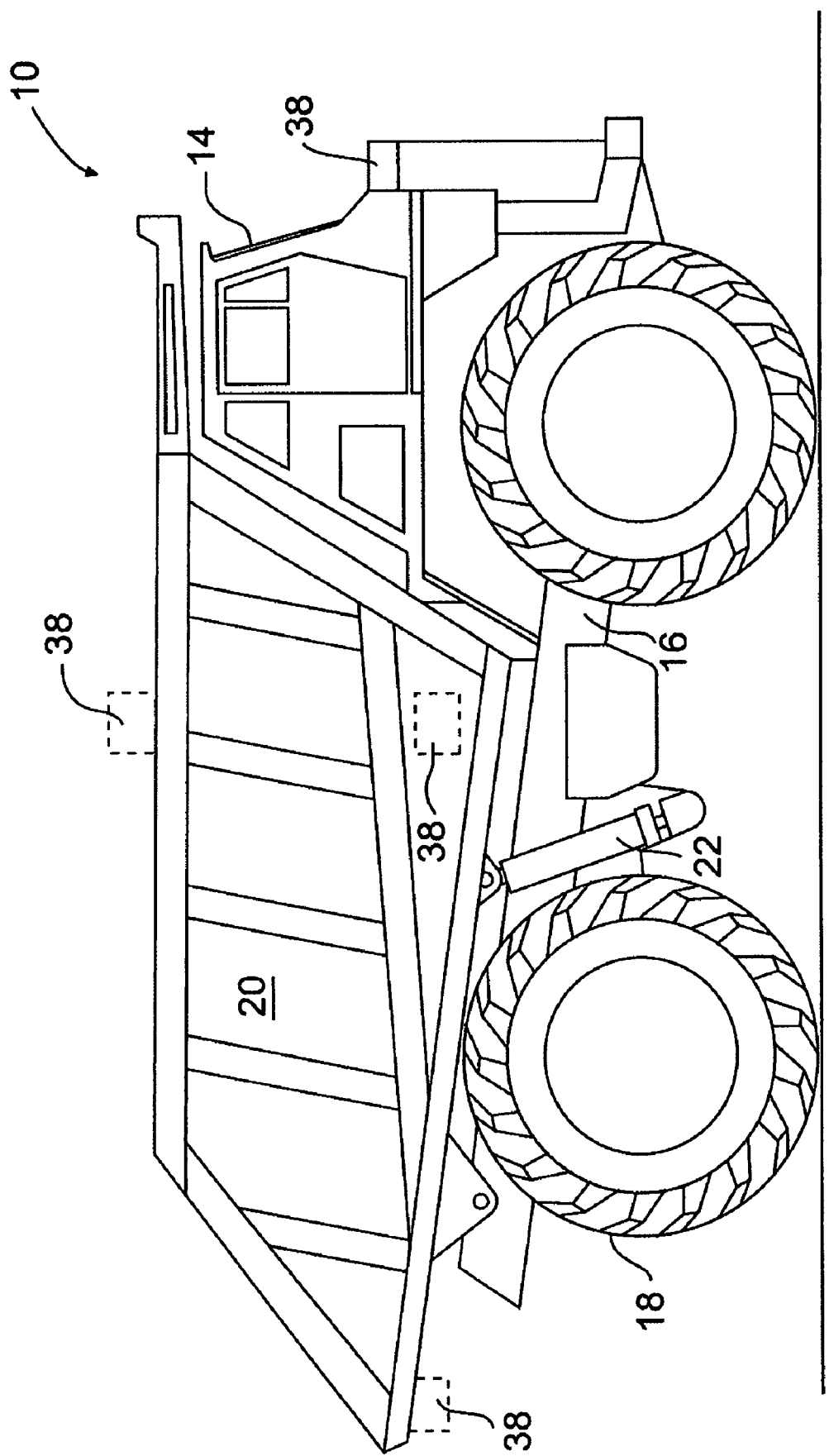
FIG. 1 is an illustration of a machine according to an exemplary embodiment of the present disclosure.
Figure 2:
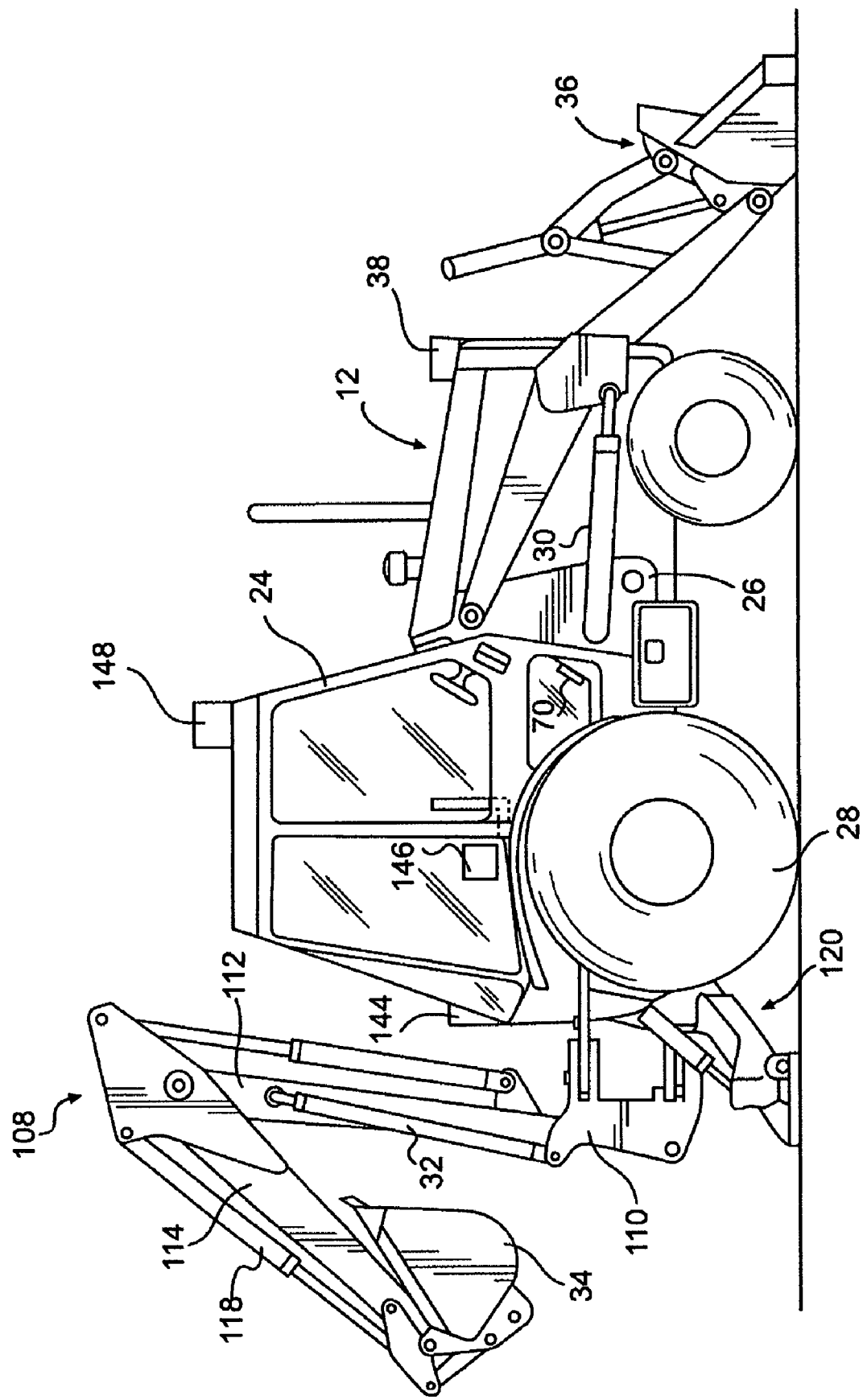
FIG. 2 is an illustration of a machine according to another exemplary embodiment of the present disclosure.

FIGS. 1 and 2 illustrate exemplary machines 10 and 12. Machine 10 of FIG. 1 may include a truck. Machine 10 may include, for example, a cab 14 for a machine operator, a frame or body 16, a drive assembly 18, a container 20 for storing material, and an actuator assembly 22 for actuating container 20. Machine 12 of FIG. 2 may include a backhoe loader. Machine may include a cab 24 for a machine operator, a frame or body 26, a drive assembly 28, work implements or tools 34 and 36, and actuator assemblies 30 and 32 for lifting, lowering, or otherwise actuating tools 34 and 36. Machines 10 and 12 may be used at job sites to perform various operations including, for example, transporting material, lifting, lowering, digging, filling, and other operations that would be apparent to one skilled in the art. It should be understood that machines 10 and 12 are exemplary only, and that aspects of this disclosure may be employed on excavators, on-highway vehicles, dozers, and/or any other suitable machines known in the art. It is also contemplated that tools 20, 34, and 36 may include asphalt cutters, augers, backhoes, blades, block handling work tools, brooms, brushcutters, buckets, cold planers, compactors, couplers, delimbers, forks, grapples, hammers, hoppers, lift groups, lifting hooks, material handling arms, multi-processors, pulverizers, rakes, rippers, saws, scarifiers, shears, snow blowers, snow plows, snow wings, stump grinders, thumbs, tillers, trenchers, and/or truss booms.

According to one aspect of the present disclosure, machines 10 and 12 may each include a stereo imaging apparatus 38. Stereo imaging apparatus 38 may be either fixedly or removably mounted on machines 10 and 12. For example, stereo imaging apparatus 38 may be mounted on or near frames 16 and 26, cabs 14 and 24, container 20, tools 34 and 36, and/or any other suitable parts of machines 10 and 12. Just a few of the possible locations where stereo imaging apparatus 38 may be mounted are shown by dashed lines in FIG. 1.

Figure 3:
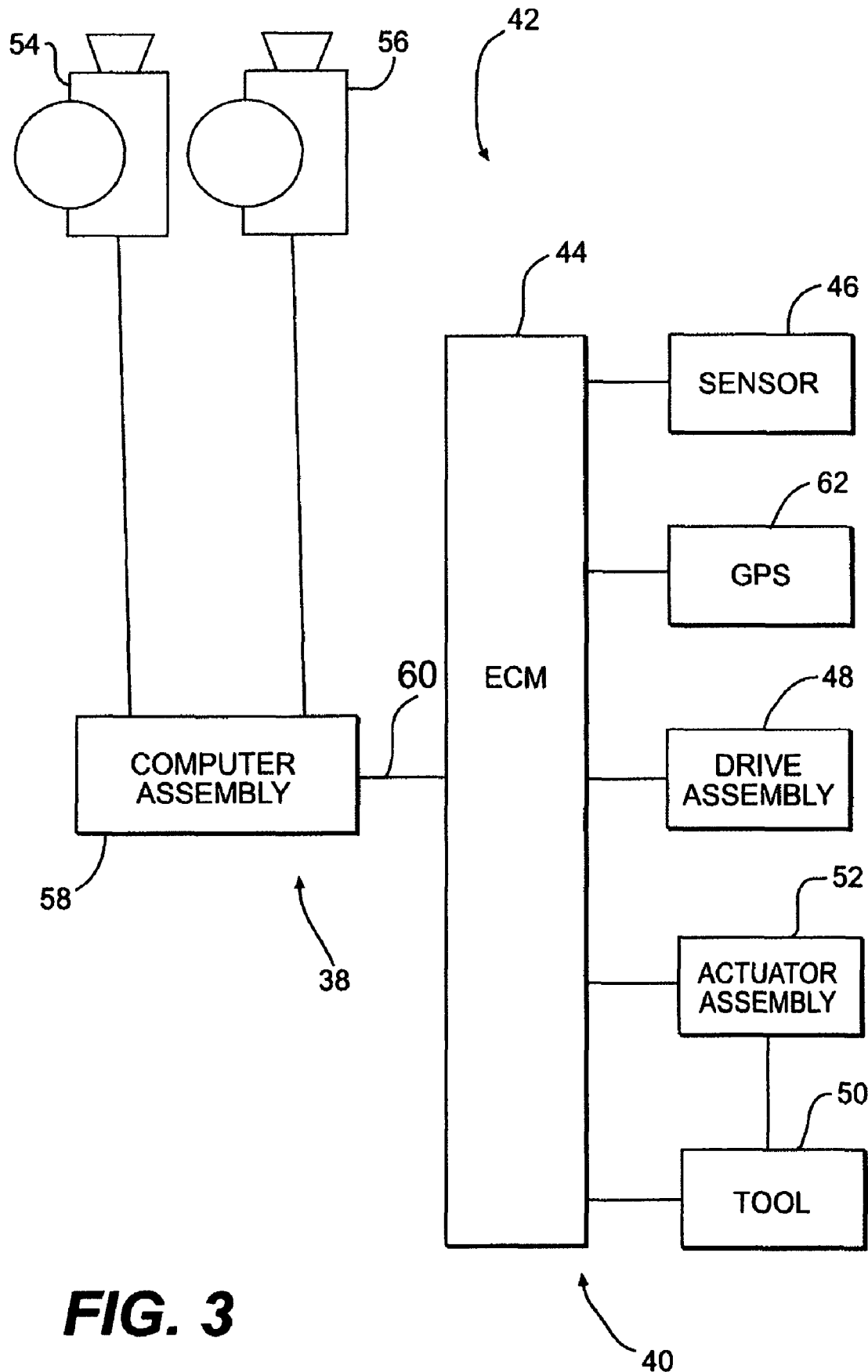
FIG. 3 is a schematic diagram of machine components according to an exemplary embodiment of the present disclosure.

A schematic illustration of exemplary components of a machine control system 42 of a machine 40 is shown in FIG. 3. Machine control system 42 may include at least one electronic control module ("ECM") 44. ECM 44 may include, for example, an on-board computer with a processor for performing calculations, executing functions, and accessing machine information stored in a memory location. Examples of machine information may include, for example, a 3-D terrain map showing an initial profile of the job site produced using surveying techniques, and a 3-D terrain map showing a desired profile of the job site. Machine information may further include data provided by at least one sensor assembly 46 included in machine 40. It is also contemplated that multiple sensor assemblies (not shown) may be placed throughout machine 40 to provide ECM 44 with information. ECM 44 may help to control machine 40, or at least assist the machine operator with controlling machine 40 and its components, including a drive assembly 48, a tool or implement 50, and an actuator assembly 52. ECM 44 may determine which actions to perform based at least in part on machine operator requests, information provided by the sensor assemblies, and/or instructions provided by a computer program or by an external source. The actions may be performed using tool 50, which may include, for example, asphalt cutters, augers, backhoes, blades, block handling work tools, brooms, brushcutters, buckets, cold planers, compactors, couplers, delimbers, forks, grapples, hammers, hoppers, lift groups, lifting hooks, material handling arms, multi-processors, pulverizers, rakes, rippers, saws, scarifiers, shears, snow blowers, snow plows, snow wings, stump grinders, thumbs, tillers, trenchers, and/or truss booms.

Stereo imaging apparatus 38 may include first and second cameras 54 and 56. First and second cameras 54 and 56 may include, for example, cameras configured to record video and/or still images. In one embodiment, first and second cameras 54 and 56 may include digital video cameras. However, it is also contemplated that analog cameras may also be used in conjunction with a frame grabber or similar device that may convert analog video into digital format. First camera 54 may be mounted a predetermined fixed distance from second camera 56. As a result of being mounted in different locations, when an object is located in view of first and second cameras 54 and 56, first camera 54 may capture a slightly different 2-D image and/or recording of the object than second camera 56. Thus, the 2-D images and/or recordings from first camera 54 may contain disparities when compared with the 2-D images and/or recordings from second camera 56. These disparities may provide depth cues that may be used to calculate or otherwise determine the depth of the object from the 2-D images and recordings. The distance between first camera 54 and second camera 56 may be selectively adjusted to change the degree of disparity between the 2-D images and/or recordings, thus allowing a user to calibrate stereo imaging apparatus 38 if desired.

Stereo imaging apparatus 38 may also include a computer assembly 58. Data from first and second cameras 54 and 56 may be supplied to computer assembly 58. Computer assembly 58 may include, for example, personal computers, laptops, personal digital assistants, cellular phones, and other suitable computing devices known in the art. Computer assembly 58 may include one or more microprocessors for performing operations and calculations and for running computer programs, memory or storage locations, input devices, and output devices, as would be apparent to one skilled in the art.

The 2-D images and/or recordings from first camera 54 may be referred to as first camera input data, while the 2-D images and/or recordings from second camera 56 may be referred to as second camera input data. Computer assembly 58 may receive first camera input data and second camera input data, and perform operations and/or run calculations using the data to determine depth dimensions of the object or objects in the aforementioned 2-D images.

By using the determined depth dimensions, computer assembly 58 may construct a 3-D model of the object or objects from the 2-D images and/or recordings produced by first and second cameras 54 and 56. Computer assembly 58 may extract images or video clips using, for example, a frame grabber or similar device, from the first camera input data and second camera input data for analysis. Computer assembly 58 may also extract specific features from the first camera input data and second camera input data, such as objects, obstacles, and/or terrain features. Computer assembly 58 may also perform other functions, including correlating disparities between first and second camera inputs, filtering data, and/or performing image stabilization.

Stereo imaging apparatus 38 may communicate with machine control system 42. In one embodiment, computer assembly 58 may be linked to ECM 44 via a data link 60 so that information may be passed from one to the other. For example, using data link 60, stereo imaging apparatus 38 may provide ECM 44 with the first camera input data, second camera input data, and/or 3-D models derived therefrom. ECM 44 may use that information to perform one or more methods. It is also contemplated that the first camera input data, second camera input data, and/or 3-D models may be displayed to a machine operator using a display screen (not shown) to help improve operator awareness.

Machine 40 may also include a global positioning system ("GPS") 62. GPS 62 may provide machine 40 with the ability to pinpoint geographic locations. The use of GPS 62 in machines to pinpoint geographic locations and provide travel directions is widely known in the art. According to one feature of this disclosure, geographic locations of objects, obstacles, and terrain features in view of stereo imaging apparatus 38 may be determined by calculating their locations or positions relative to machine 40. Using this information, a map of the job site may be marked with GPS coordinates, such that once GPS 62 pinpoints the geographic location of an area being analyzed by stereo imaging apparatus 38, images, recording, and/or 3-D models of the area may be associated with a location on the map. Additionally or alternatively, use of GPS 62 may not be required if a site contains one or more GPS marked objects that machine 40 may reference itself to.

Figure 4:
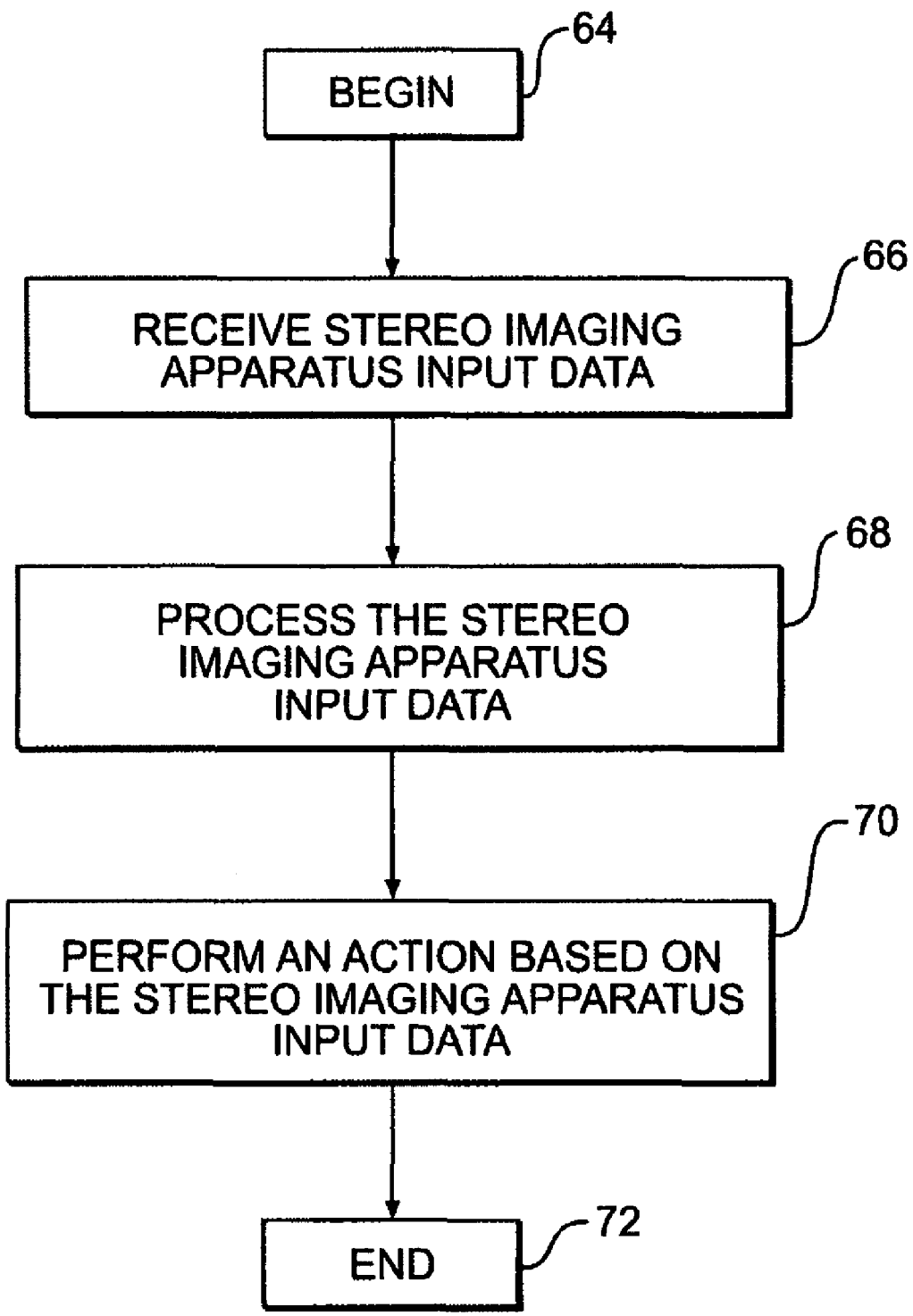
FIG. 4 is a flow diagram of a method according to an exemplary embodiment of the present disclosure.

FIG. 4 shows a flow diagram of a method according to one aspect of the disclosure. The method may begin (step 64) with machine control system 42 receiving stereo imaging apparatus input data (e.g., the first camera input data, second camera input data, and/or 3-D models) from stereo imaging apparatus 38 (step 66). Machine control system 42 may process the input data (step 68). Machine control system 42 may perform one or more actions based on the input data (step 70). Afterwards, the method may end (step 72).

Figure 5:
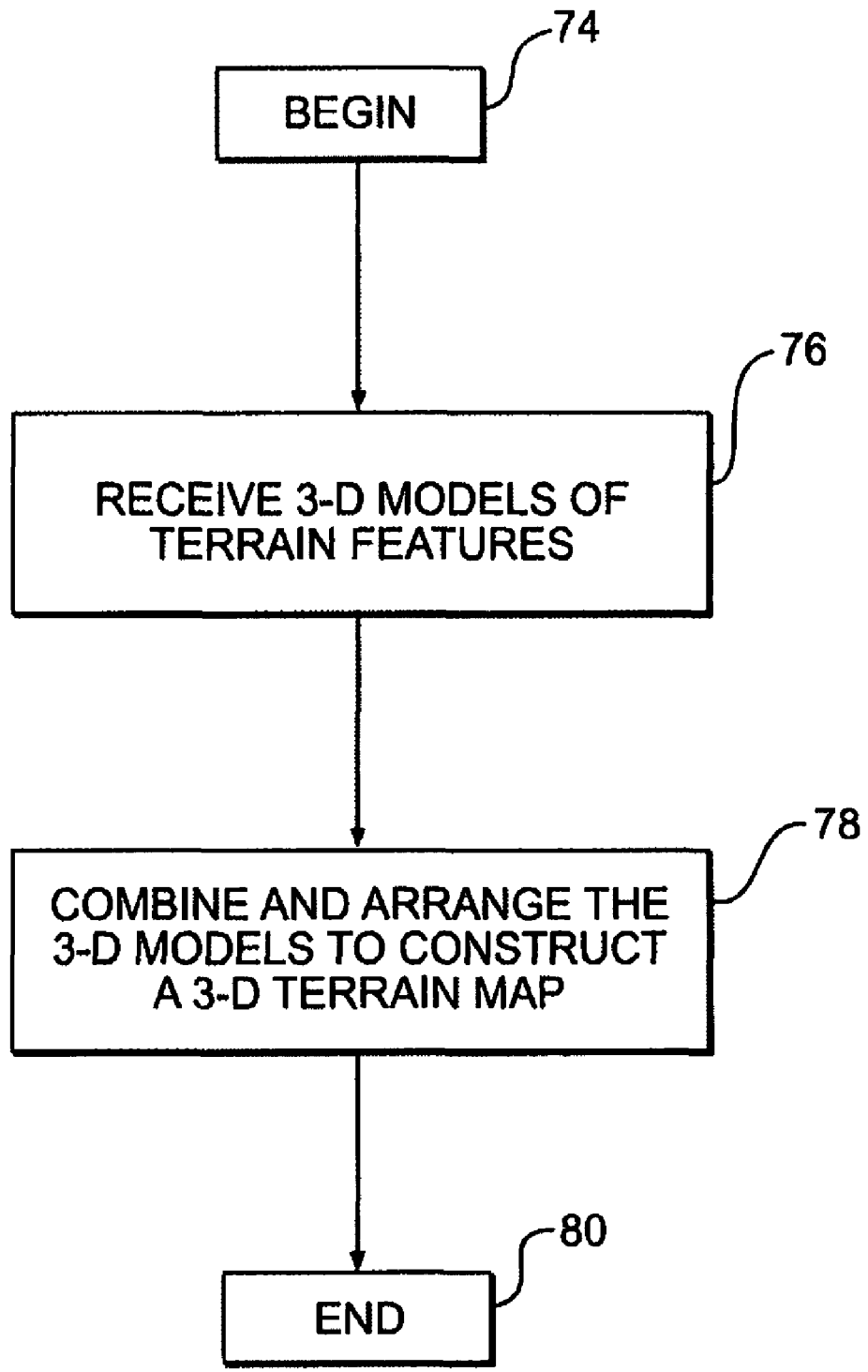
FIG. 5 is a flow diagram of a method according to another exemplary embodiment of the present disclosure.

FIG. 5 shows a flow diagram of a method according to another aspect of the disclosure. The method may begin (step 74) with machine control system 42 receiving 3-D models of terrain features of a job site from stereo imaging apparatus 38 (step 76). Machine control system 42 may process the 3-D models by combining and arranging the 3-D models to construct a larger 3-D terrain map showing the current terrain profile of the job site (step 78). For example, stereo imaging apparatus 38 may produce a 3-D model of a first portion of the job site. Using GPS 62, the geographic location occupied by the first portion may be determined. The 3-D model of the first portion may be incorporated into its proper position in the 3-D terrain map of the job site. This process may be repeated for another portion of the job site, and then another, until every portion of the job site has been updated to include the 3-D models of those portions generated by stereo imaging apparatus 38. It is further contemplated that these mapping steps may be carried out automatically as the machine operator pilots machine 40 to various locations in the job site. When the 3-D terrain map is completed, the method may end (step 80).

Figure 6:
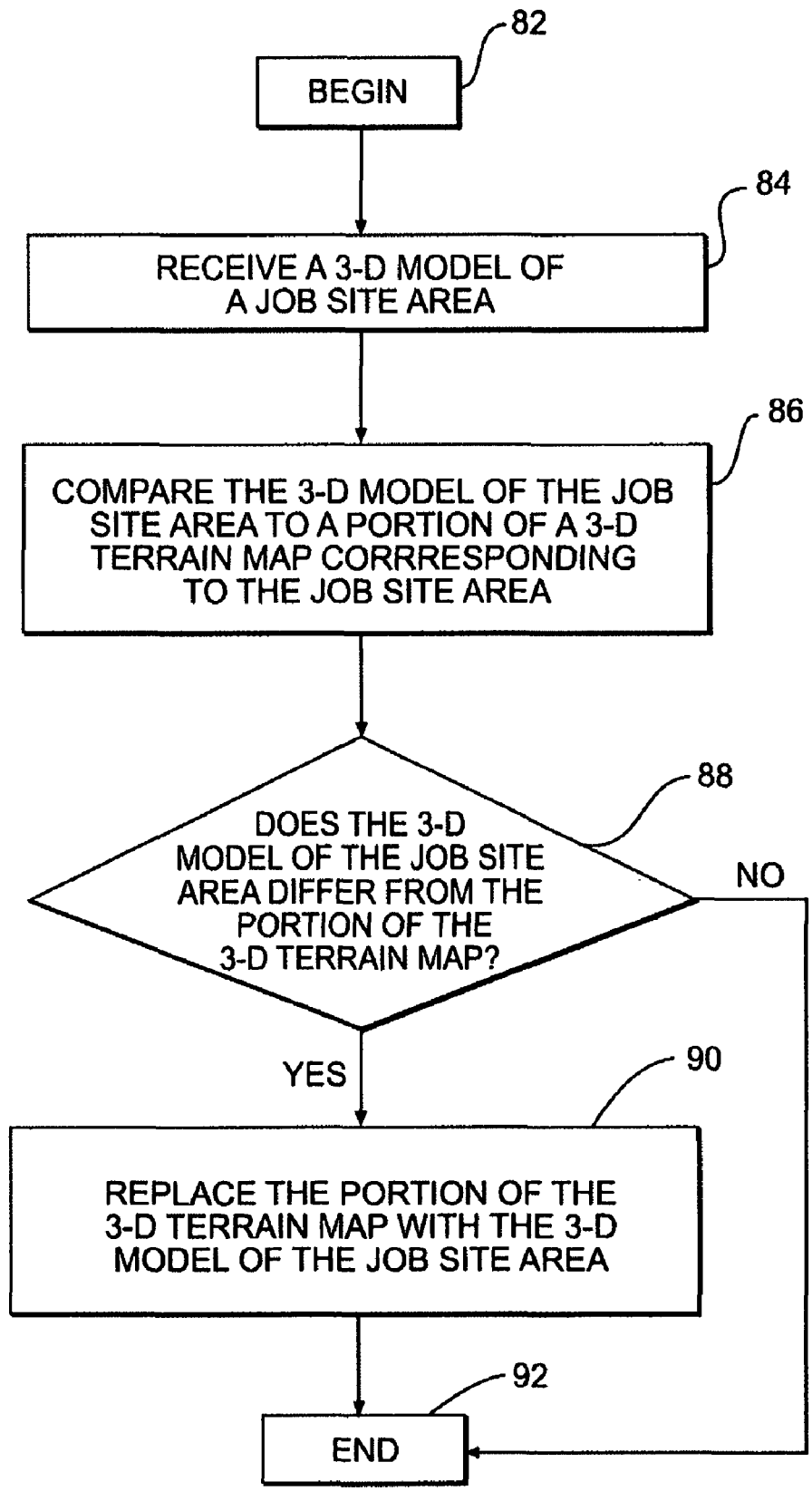
FIG. 6 is a flow diagram of a method according to yet another exemplary embodiment of the present disclosure.

FIG. 6 shows a flow diagram of a method according to yet another aspect of the disclosure. The method may begin (step 82) with machine control system 42 receiving a 3-D model of an area of a job site from stereo imaging apparatus 38 (step 84). Machine control system 42 may compare the 3-D model of the area to a portion of the 3-D terrain map corresponding to that area (step 86) and determine whether the 3-D model of the area differs from the portion of the 3-D terrain map (step 88). If the 3-D model of the area differs from the portion of the 3-D terrain map ("YES"), machine control system 42 may update that portion of the 3-D terrain map by replacing it with the 3-D model (step 90). If no difference exists ("NO"), the method may end (step 92). It is contemplated that this process may be repeated for other areas of the job site until every area of the job site has been updated. Furthermore, GPS 62 may be used to determine which portion of the 3-D terrain map corresponds to the area being analyzed by stereo imaging apparatus 38. When the 3-D terrain map is updated, the method may also end (step 92).

Figure 7:
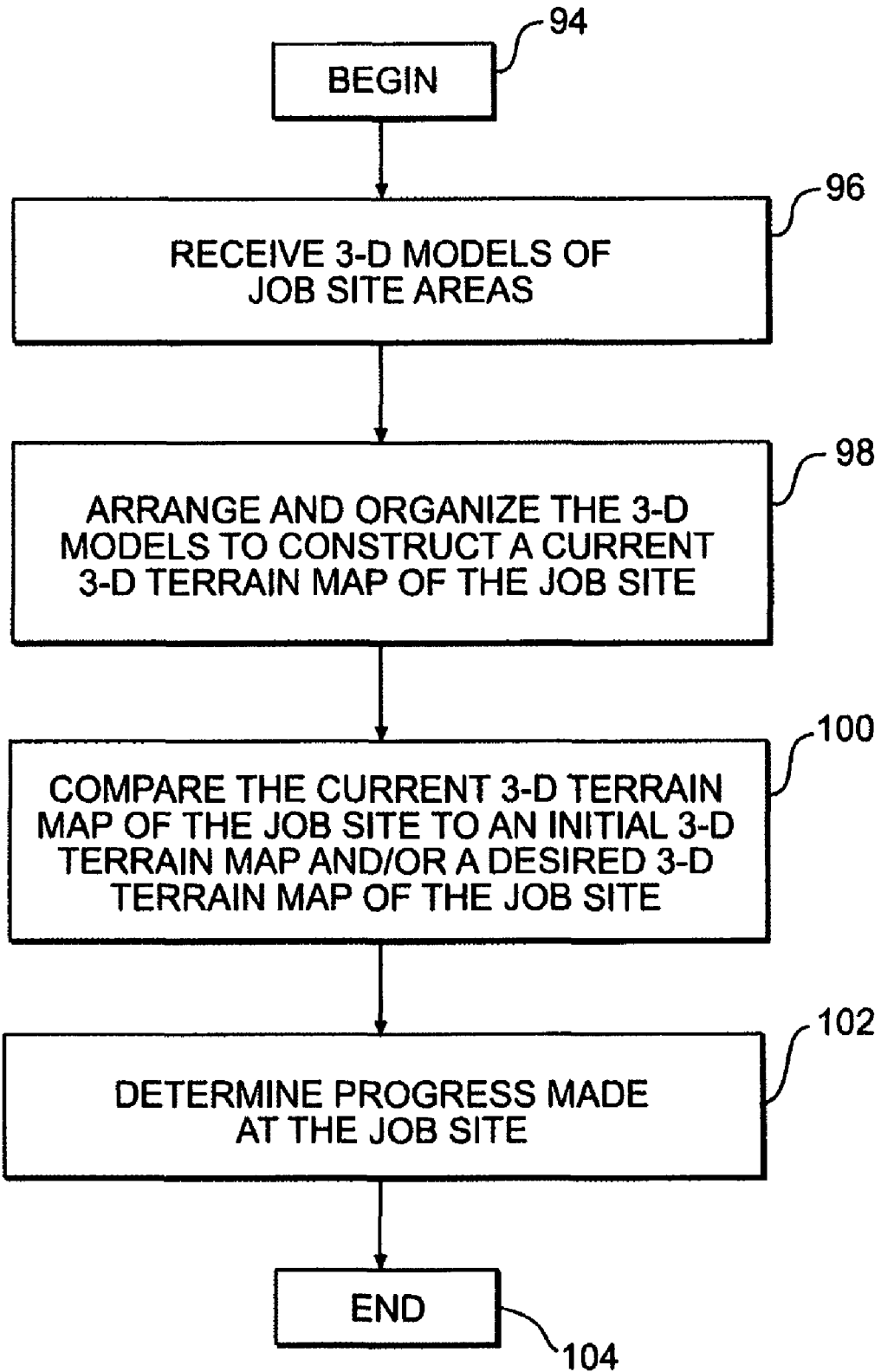
FIG. 7 is a flow diagram of a method according to yet another exemplary embodiment of the present disclosure.

FIG. 7 shows a flow diagram of a method according to yet another aspect of the disclosure. The method may begin (step 94) with machine control system 42 receiving 3-D models of areas of a job site from stereo imaging apparatus 38 (step 96). Machine control system 42 may process the 3-D models by arranging and organizing the 3-D models to create a current 3-D terrain map of the job site (step 98). Machine control system 42 may compare the current 3-D terrain map to an initial 3-D terrain map of the job site and/or a desired 3-D terrain map of the job site (step 100). By determining where the current conditions fall with respect to the initial conditions and/or the desired conditions, machine control system 42 may determine the progress made at the job site (step 102). For example, step 102 may include determining the difference between the current conditions and the initial conditions, determining the difference between the current conditions and the desired conditions, and/or dividing the difference between the current and initial conditions by the difference between the desired and initial conditions to calculate percentage completed. Step 102 may also include generating a progress map that may provide one or more visual indicators indicative of progress made at the job site including, for example, a bar chart. After the progress made has been determined, the method may end (step 104).

Figure 8:
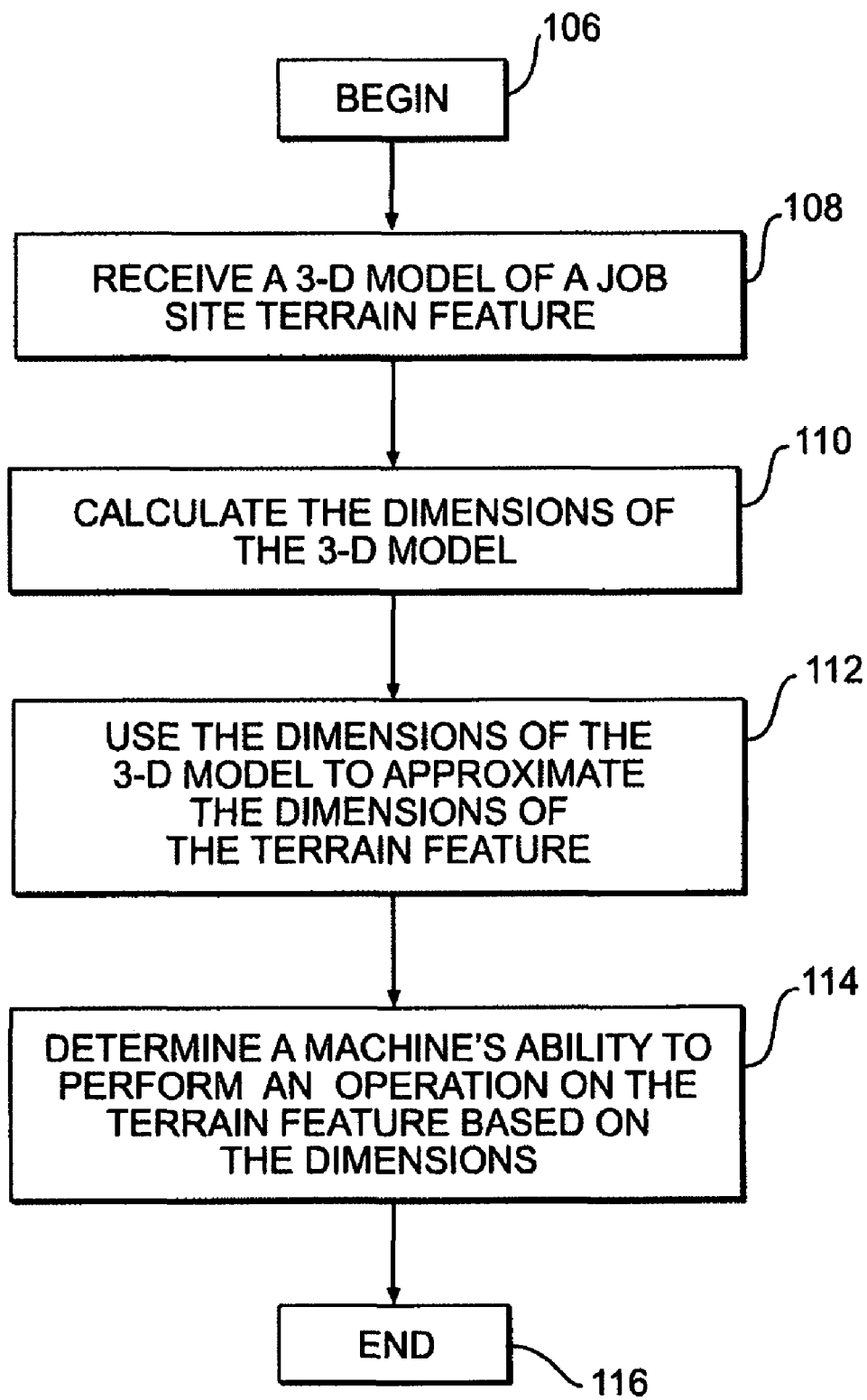
FIG. 8 is a flow diagram of a method according to yet another exemplary embodiment of the present disclosure.

FIG. 8 shows a flow diagram of a method according to yet another aspect of the disclosure. The method may begin (step 106) with machine control system 42 receiving a 3-D model of a terrain feature at a job site from stereo imaging apparatus 38 (step 108). Machine control system 42 may calculate the dimensions of the 3-D model (step 110). Machine control system 42 may use the calculated dimensions to approximate the dimensions of the terrain feature (step 112). Machine control system 42 may compare the approximate dimensions of the terrain feature to a machine characteristic, such as, for example, load carrying capacity, to gauge a machine's ability to work on the terrain feature (step 114). Afterwards, this method may end (step 116). It should be understood that the method may repeat as other obstacles or terrain features appear before stereo imaging apparatus 38.

For example, if the 3-D model is representative of a hole or trench at the job site, the length, width, and depth of the 3-D model may be determined to provide an approximation of the actual dimensions and volume of the hole or trench. If the 3-D model is representative of a pile, the length, width, and depth of the 3-D model may be determined to provide an approximation of the actual dimensions and volume of the pile. For machine 10, a machine control system (not shown), similar to machine control system 42, may compare the approximate volume of a pile of earth to the known volume of container 20 to determine whether machine 10 has enough room to hold the pile of earth, the number of trips that will be required to move the pile of earth, and/or the time it will take to move the pile of earth. For machine 12, a machine control system (not shown), similar to machine control system 42, may compare the approximate volume of the pile of earth to the known volume of tools 34 and/or 36 to determine the number and/or type of movements of tools 34 and 36 that may be required to move the pile of earth, and/or the approximate time it would take to move the pile of earth with tools 34 and 36. It is also contemplated that machine control system 42 may estimate the volume of material carried by tool 50 using stereo imaging apparatus 38. This may be accomplished by, for example, using the methodology set forth in FIG. 8, or by generating a 3-D model of tool 50 itself and/or the material carried by or in front of tool 50.

Stereo imaging apparatus 38 may also be used to determine the percentage of fill of tool 50 based at least in part on the estimated volume of material, the volume or capacity of tool 50, and/or the level to which tool 50 is filled according to a 3-D model of tool 50. These measurements may be used for cycle optimization. A cycle may include several segments, including, for example, dig, lift, swing, dump, swing return, lower to dig, position bucket angle, and/or repeat. Cycle optimization may include improving or optimizing metrics associated with the cycle. These metrics may include time, productivity, energy, or any other suitable cycle metric. Skilled operators may combine as many functions as possible to achieve the greatest amount of material moved per unit of time. The following example may help to clarify one aspect of the optimization process. If, for example, the time it takes to fill tool 50 to 125% of its level full capacity takes 40% longer than filling tool 50 to its level full capacity, then that may indicate that maximizing fill for tool 50 may not result in maximum productivity or material moved per gallon of fuel. Thus, an operator and/or machine control system 42 may choose to only fill tool 50 to its level full capacity to help reduce the performance penalty associated with filling tool 50 to 125% of its level full capacity. The ability to recognize when tool 50 is at some percentage of fill versus time may be critical to understanding how to optimize the cycle. This ability may also be important for determining when to stop an action and proceed to the next segment of the cycle.

Stereo imaging apparatus 38 may also be used to determine payload. A tool's payload may be characterized as the actual amount of material in the tool on each digging cycle. Payload may be dependent on a number of factors, including, for example, tool size, shape, curl force, and soil characteristics such as a fill factor. Fill factors may vary between materials, and may also be found in reference manuals and tables, as would be apparent to one skilled in the art. The fill factor may be used to determine average tool payload, which may equal the product of heaped tool capacity multiplied by tool fill factor.

Stereo imaging apparatus 38 may also be used to determine volume productivity. For example, stereo imaging apparatus 38 may estimate the topography of the surface of material carried by a tool. This may provide an estimate of the volume of material captured during a cycle, allowing for measurement of volume captured per cycle or yards per hour, as opposed to weight based productivity, such as tons per hour. The 3-D model may further be used to determine a payload's center of gravity, and to prevent or anticipate payload spillage.

Figure 9:
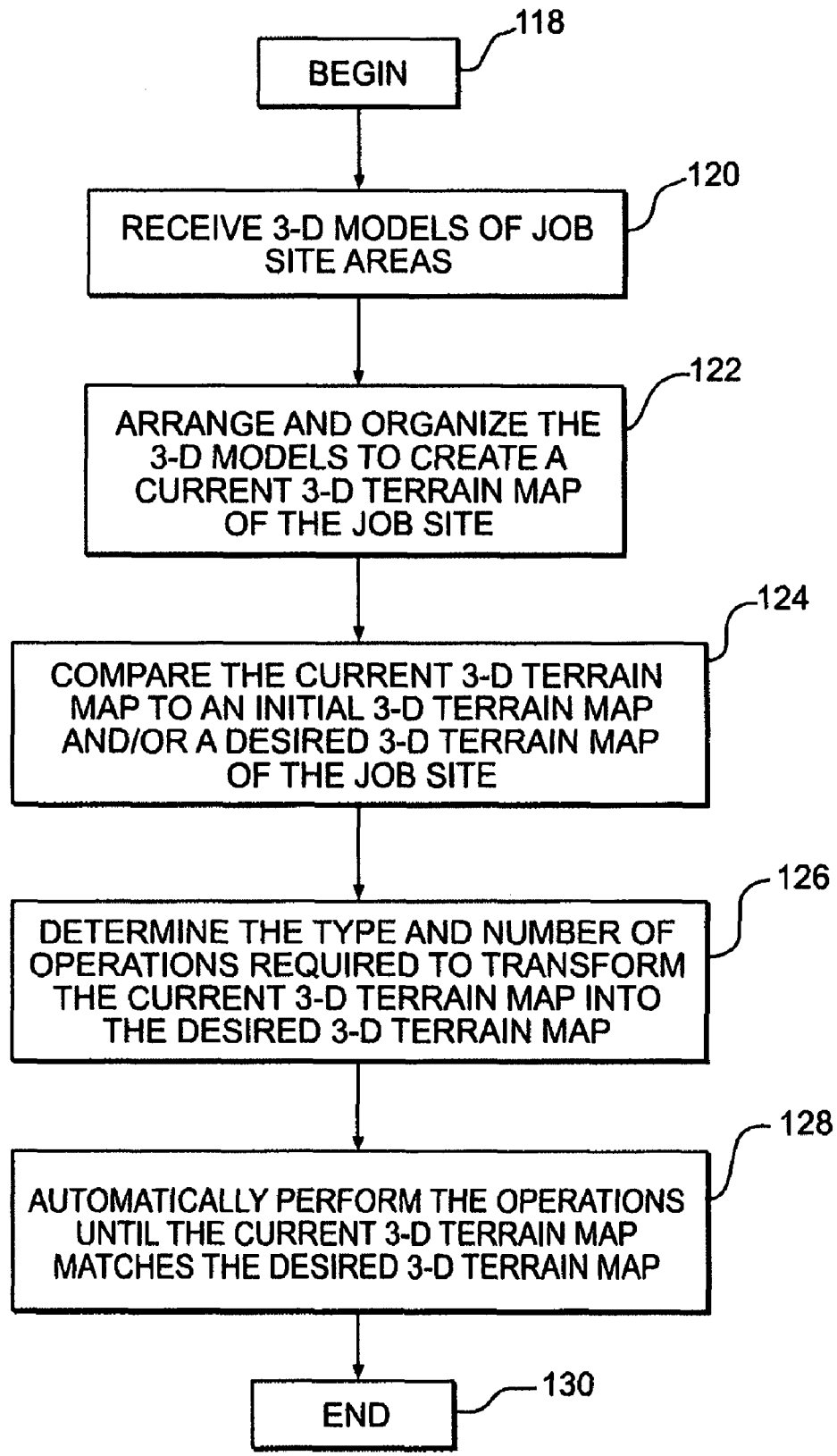
FIG. 9 is a flow diagram of a method according to yet another exemplary embodiment of the present disclosure.

FIG. 9 shows a flow diagram of a method according to yet another aspect of the disclosure. The method may begin (step 118) with machine control system 42 receiving 3-D models of areas of a job site from stereo imaging apparatus 38 (step 120). Machine control system 42 may process the 3-D models by arranging and organizing the 3-D models to create a current 3-D terrain map of the job site (step 122). Machine control system 42 may compare the current 3-D terrain map to an initial 3-D terrain map of the job site and/or a desired 3-D terrain map of the job site (step 124). Based at least in part on the results of the comparison, machine control system 42 may determine the type and number of operations required to transform the current 3-D terrain map to fit the profile of the desired 3-D terrain map (step 126). This may be accomplished using steps 108, 110, 112, and 114 described above. Machine control system 42 may pinpoint a location using, for example, GPS 62, one or more of the 3-D terrain maps, or by any other suitable method of locating a position. Machine control system 42 may automatically instruct drive assembly 48 to transport machine 40 to the location, and when machine 40 reaches the location, machine control system 42 may automatically instruct actuator assembly 52 and tool 50 to operate on the terrain at that location until the profile of the terrain substantially matches the desired conditions (step 128). At this point, the method may end (step 130). However, it should be understood that this method may be repeated for any position in the job site requiring modification, until the entire job site meets the desired conditions.

Figure 10:
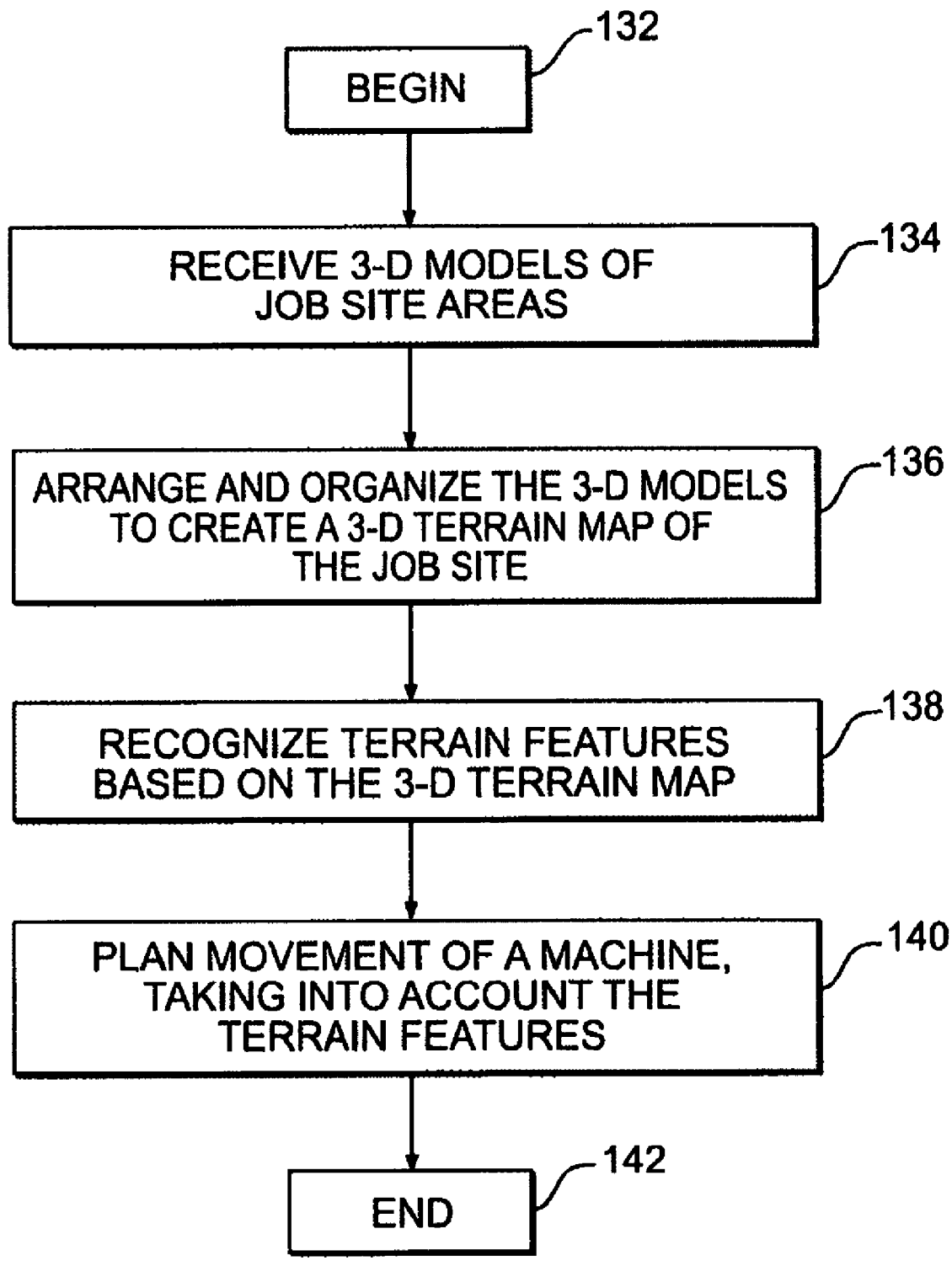
FIG. 10 is a flow diagram of a method according to yet another exemplary embodiment of the present disclosure.

FIG. 10 shows a flow diagram of a method according to yet another aspect of the disclosure. The method may begin (step 132) with machine control system 42 receiving 3-D models of areas of a job site from stereo imaging apparatus 38 (step 134). Machine control system 42 may process the 3-D models by arranging and organizing the 3-D models to create a 3-D terrain map of the job site (step 136). As machine 40 travels between job site locations, machine may encounter one or more terrain features, including, for example, changes in grade, obstacles, drop-offs, and/or any other terrain features commonly found at job sites. Prior to or during movement of machine 40, machine control system 42 may anticipate or recognize those terrain features in the 3-D terrain map (step 138), may take action to avoid or compensate for those terrain features (step 140). For example, machine control system 42 may anticipate or recognize that its path of travel passes over a ditch in the current 3-D terrain map. Machine control system 42 may change its path of travel to avoid the ditch. Machine control system 42 may also anticipate or recognize that a grade change exists along its path of travel based on the profile of the current 3-D terrain map, and may raise tool 50 so tool 50 does not collide with the earth as the grade changes, or lower tool 50 so tool 50 does not accidentally drop a load as the grade changes. At this point the method may end (step 142). However, it should be understood that this method may repeat anytime machine 40 travels from one location to another.

The methods and steps depicted in FIGS. 4-10 may be performed one at a time. However, it should be understood that machine control system 42 may perform more than one, or even all of the methods and steps depicted in FIGS. 4-10, simultaneously. For example, as machine control system 42 receives data, performs calculations, and provides instructions while carrying out one of the methods, machine control system 42 may use the same information to carry out the steps of one or more of the other methods. Thus, machine control system 42 may constantly receive, process, and update data that may be usable for one method, even while machine control system 42 is performing another method or operation. Furthermore, each of the methods may be repeated if desired.

According to another aspect of this disclosure, multiple stereo imaging apparatuses 144, 146, and 148 may be mounted on a single machine, such as machine 12 of FIG. 2. Each of stereo imaging apparatuses 144, 146, and 148 may be structured similarly to stereo imaging apparatus 38, and may also operate with machine control system 42 in the previously described manner. Stereo imaging apparatuses 38, 144, 146, and 148 may be mounted on the top, front, both sides, and/or the rear of each of machine 12. This arrangement may provide a 360° view of the job site terrain around machine 12, thus providing machine 12 with more data for generating 3-D terrain maps and for performing the methods disclosed in FIGS. 4-10. The number and arrangement of stereo imaging apparatuses disclosed herein are exemplary, and it should be understood that a different number of stereo imaging apparatuses and/or a different arrangement of stereo imaging apparatuses may be used if desired.

Figure 11:
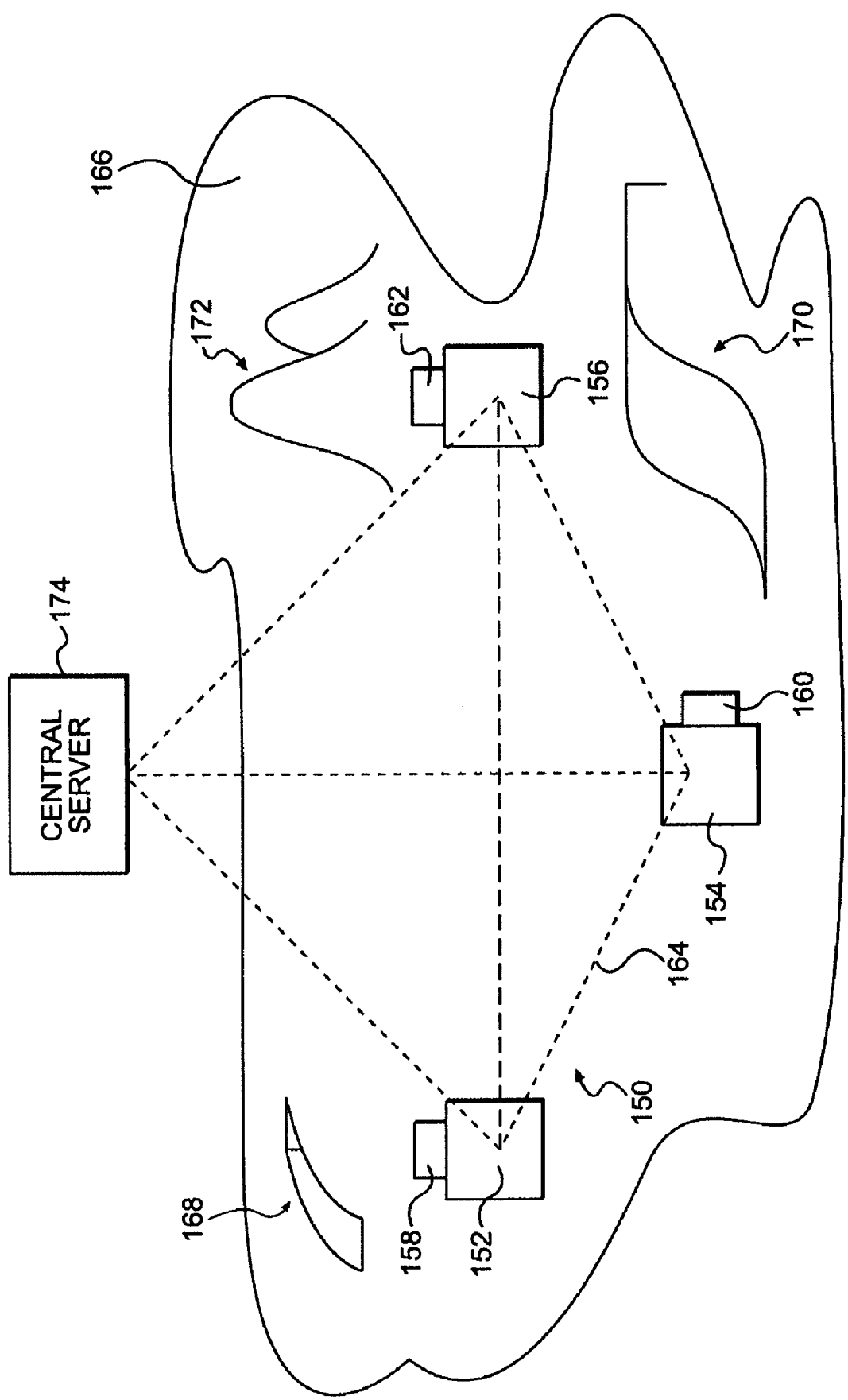
FIG. 11 is a schematic diagram of a fleet of machines according to an exemplary embodiment of the present disclosure.

According to yet another aspect of this disclosure, and as shown schematically in FIG. 11, a fleet 150 of machines 152, 154, and 156 may be provided. Each of machines 152, 154, and 156 may include elements similar to those discussed above with respect to machine 40. For example, machines 152, 154, and 156 may include one or more stereo imaging apparatuses 158, 160, and 162. Stereo imaging apparatuses 158, 160, and 162 may resemble stereo imaging apparatus 38 described previously, and may operate in a similar manner.

Machines 152, 154, and 156 may communicate with one another through a communication link 164, such as, for example, a satellite data link, cellular telephone communications link, radio link, bluetooth, 802.11, a wired communications link, or any other suitable communication channel known in the art. Through communication link 164, each of machines 152, 154, and 156 may transmit terrain data to the other machines. Each of machines 152, 154, and 156 may also receive terrain data from the other machines. It is contemplated that the data may be transmitted from, received by, and/or processed by ECMs (not shown) of machines 152, 154, and 156.

Machine 152 may be located in an area of a job site 166 a distance away from machines 154 and 156. As such, stereo imaging apparatus 158 of machine 152 may be able to see a terrain feature 168, or an aspect thereof, that may not be easily viewed by stereo imaging apparatuses 160 and 162 of machines 154 and 156. Machine 152 may generate a 3-D model of terrain feature 168, which may be used to update its current 3-D terrain map. Machine 152 may also transmit the 3-D model of terrain feature 168, its GPS coordinates, and any other suitable information, to machines 154 and 156, allowing machines 154 and 156 to update their current 3-D terrain maps to include the 3-D model of terrain feature 168. This allows machines 154 and 156 to anticipate or recognize terrain feature 168 even though their stereo imaging apparatuses 160 and 162 may be unable to see terrain feature 168. Similarly, machine 154 may provide information on a terrain feature 160 to machines 152 and 156, while machine 156 may provide information on a terrain feature 172 to machines 152 and 154.

Additionally or alternatively, machines 152, 154, and 156 may transmit the generated 3-D models and any other suitable information to a central server 174 using communication link 164. At central server 174, the data may be processed and organized to generate and/or update a 3-D terrain map of the job site stored in central server 174. Further, each of machines 152, 154, and 156 may receive data from central server 174, including the 3-D terrain map, thus allowing machines 152, 154, and 156 to be aware of terrain features and obstacles that may be a substantial distance away, obstructed from view, or otherwise out of viewing range. Thus, if machines 152, 154, or 156 are instructed to move to a different areas of the job site, they may be aware of terrain features and obstacles in their paths of travel, and also terrain features and obstacles at their destinations, even if they have not been previously exposed to those areas.

INDUSTRIAL APPLICABILITY

The disclosed machine control system and method may have applicability in environments in which machines are used to assist in the performance of tasks.

A machine 40 that include a machine control system 42 with a stereo imaging apparatus 38 may possess the ability to generate 3-D models of job site terrain features using 2-D images, and use those 3-D models to automate one or more machine processes. For example, machine 40 may identify job site obstacles based on the 3-D models, and may automatically alter its path of travel through the job site to avoid these obstacles. Machine 40 may also use the 3-D models to anticipate changes in grade or other terrain features of job site, and machine 40 may automatically alter the position of a tool 50 or implement accordingly to avoid unwanted contact between tool 50 and the earth, and to avoid dropping or spilling a load. It is also contemplated that machine 40 may set boundaries around objects to prevent a machine operator from accidentally piloting machine 40 into the object, and/or prevent the machine operator from accidentally striking the object with tool 50. Thus, the frequency of accidents occurring at the job site may be reduced.

Stereo imaging apparatus 38 may also be useful for gathering job site data. The 3-D models generated by stereo imaging apparatus 38 may be used to create and update a 3-D terrain map of the job site in real-time. The 3-D terrain map may be compared against an initial terrain map and/or a desired terrain map to estimate the degree of progress made at the job site. The 3-D terrain map may also provide machine 40 and the machine operator with awareness of terrain features inside and outside of viewing range. Furthermore, the 3-D models may be used to estimate the dimensions of terrain features to ensure that machine 40 can perform a particular operation, and to indicate the need for assistance if necessary.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A machine control system, comprising:
   a machine mounted stereo imaging apparatus configured to provide a 3-D model indicative of an area of a job site, the area being in view of the stereo imaging apparatus; and
   a control module configured to:
   determine a geographic location of the area; and
   incorporate the 3-D model into a location in a 3-D map of the job site based on the geographic location of the area, the 3-D map of the job site covering the area and one or more other areas of the job site outside the view of the stereo imaging apparatus.

2. The machine control system of claim 1, wherein the control module is further configured to approximate dimensions of the area by determining dimensions of the 3-D model.

3. The machine control system of claim 2, wherein the control module is further configured to compare the dimensions of the area to a capacity of a tool.

4. The machine control system of claim 1, wherein the control module is further configured to automatically perform an operation with a tool based on characteristics of the 3-D model.

5. The machine control system of claim 4, wherein performing the operation includes engaging the area with the tool.

6. The machine control system of claim 4, wherein performing the operation includes adjusting a position of the tool to compensate for changes in grade.

7. A method of controlling a machine, comprising:
   generating a 3-D model indicative of an area of a job site with a machine mounted stereo imaging apparatus, the area being in view of the stereo imaging apparatus;
   determining a geographic location of the area; and
   incorporating the 3-D model into a location in a 3-D map of the job site based on the geographic location of the area, the 3-D map of the job site covering the area and one or more other areas of the job site outside the view of the stereo imaging apparatus.

8. The method of claim 7, further including approximating dimensions of the area by determining dimensions of the 3-D model.

9. The method of claim 8, further including comparing the dimensions of the area to a capacity of a tool.

10. The method of claim 7, further including comparing the 3-D map that includes the 3-D model to at least one of an original job site profile and a desired job site profile to determine progress made at a job site.

11. The method of claim 7, further including generating an updated 3-D model when the area changes, and updating the 3-D map that includes the 3-D model by replacing the 3-D model with the updated 3-D model.

12. The method of claim 7, further including automatically performing an operation with a tool based on characteristics of the 3-D model.

13. The method of claim 12, wherein performing the operation includes adjusting a position of the tool to compensate for changes in grade.

14. The method of claim 12, wherein performing the operation includes engaging the terrain feature with the tool.

15. A machine, comprising:
a machine control system, including:
a machine mounted stereo imaging apparatus configured to provide a 3-D model indicative of an area of a job site, the area being in view of the stereo imaging apparatus; and
a control module configured to;
determine a geographic location of the area; and
incorporate the 3-D model into a location in a 3-D map of the job site based on the geographic location of the area, the 3-D map of the job site covering the area and one or more other areas of the job site outside the view of the stereo imaging apparatus.

16. The machine of claim 15, wherein the control module is further configured to approximate dimensions of the area by determining dimensions of the 3-D model.

17. The machine of claim 15, wherein the control module is further configured to compare the dimensions of the area to a capacity of a tool.

18. The machine of claim 15, wherein the control module is further configured to automatically perform an operation with a tool based on characteristics of the 3-D model.

19. The machine of claim 18, wherein performing the operation includes engaging the area with the tool.

20. The machine of claim 18, wherein the operation includes adjusting the tool to compensate for changes in grade.

* * * * *